(12) United States Patent
Hou et al.

(10) Patent No.: US 12,661,720 B2
(45) Date of Patent: Jun. 23, 2026

(54) SPINDLE AUTOMATIC FEED MECHANISM OF DRILLING MACHINE WITH SELF-ADAPTIVE ELECTROMECHANICAL TRANSMISSION

(71) Applicants: Jiangsu Yishou Machinery Technology Co., Ltd., Yangzhou (CN); Shen Qiao, Yangzhou (CN)

(72) Inventors: Guozheng Hou, Yangzhou (CN); Shen Qiao, Yangzhou (CN)

(73) Assignees: Jiangsu Yishou Machinery Technology Co., Ltd., Yangzhou (CN); Shen Qiao, Yangzhou (CN)

( * ) Notice: Subject to any disclaimer, the term of this patent is extended or adjusted under 35 U.S.C. 154(b) by 396 days.

(21) Appl. No.: 18/496,545

(22) Filed: Oct. 27, 2023

(65) Prior Publication Data

US 2025/0135558 A1 May 1, 2025

(51) Int. Cl.
*B23B 47/26* (2006.01)
*B23Q 5/32* (2006.01)

(52) U.S. Cl.
CPC .............. *B23B 47/26* (2013.01); *B23Q 5/326* (2013.01)

(58) Field of Classification Search
CPC .. B23Q 5/326; B23Q 5/32; B23Q 5/52; B23B 39/16; B23B 47/26
See application file for complete search history.

(56) References Cited

U.S. PATENT DOCUMENTS 2,269,641 A * 1/1942 Woytych ................ B23B 39/02
82/131
5,328,303 A * 7/1994 Jang ........................ B23Q 5/52
408/137

FOREIGN PATENT DOCUMENTS

| CN | 2505211 | Y | * | 8/2002 | |
|----|---------|---|---|--------|---|
| CN | 2511434 | Y | * | 9/2002 | |
| CN | 2696747 | Y | * | 5/2005 | |
| CN | 202114305 | U | * | 1/2012 | |
| CN | 103573960 | A | | 2/2014 | |
| CN | 103722213 | B | * | 12/2015 | .............. B23Q 5/32 |
| CN | 106970522 | A | | 7/2017 | |
| CN | 217775665 | U | | 11/2022 | |

(Continued)

OTHER PUBLICATIONS

CN202114305U translation (Year: 2012).*

(Continued)

*Primary Examiner* — Michael W Hotchkiss

(74) *Attorney, Agent, or Firm* — JEEN IP LAW, LLC

(57) ABSTRACT

A spindle automatic feed mechanism of drilling machine with self-adaptive electromechanical transmission comprises a head housing assembly, an elevating axis assembly, and a large motor. The head housing assembly comprises a spindle assembly, a spindle sleeve, a reducing motor, a first worm, a first worm gear, and a turbine shaft. The elevating axis assembly comprises an elevating axis, a first cylindrical gear, a second cylindrical gear, a left end face clutch gear, a right end face clutch gear, and a cam. A second v-belt pulley is connected to an upper output end of the large motor. The invention adopts the independent electromechanical transmission mechanism to drive a spindle system to realize spindle automatic feeding, the feeding speed is fixed. Every rotational speed of the spindle has a suitable self-adaptive spindle feed amount correspondingly.

2 Claims, 6 Drawing Sheets

(56)        References Cited

FOREIGN PATENT DOCUMENTS

CN        218476651 U      2/2023

OTHER PUBLICATIONS

CN103722213B translation (Year: 2015).*
CN2696747Y translation (Year: 2005).*
CN2511434Y translation (Year: 2002).*
CN2505211Y translation (Year: 2002).*

* cited by examiner

SPINDLE AUTOMATIC FEED MECHANISM OF DRILLING MACHINE WITH SELF-ADAPTIVE ELECTROMECHANICAL TRANSMISSION

TECHNICAL FIELD

The present invention relates to the technical field of drilling machines, and more particularly to a spindle automatic feed mechanism of drilling machine with self-adaptive electromechanical transmission.

BACKGROUND

A conventional spindle automatic feed mechanism of drilling machine generally separates a drive chain from a main drive chain to a stepped gearbox, and then transmits to a spindle system, thereby achieving a stepped spindle automatic feeding with a fixed transmission ratio, the structure thereof is complicated, and a span range of the feed amount is small. For different drilling diameters and different spindle rotational speeds, the feed amount must be adjusted manually in advance, thus the operation is inconvenient. When the spindle realizes a stepless speed regulation, the above problems have become more apparent.

SUMMARY

In order to solve the above existing problems, the present invention provides a spindle automatic feed mechanism of drilling machine with self-adaptive electromechanical transmission. The present invention is realized by the following technical solutions.

A spindle automatic feed mechanism of drilling machine with self-adaptive electromechanical transmission comprises a head housing assembly, an elevating axis assembly, and a large motor.

The head housing assembly comprises a spindle assembly, a spindle sleeve, a reducing motor, a first worm, a first worm gear, and a turbine shaft. A first v-belt pulley is connected with an upper end of the spindle assembly, and the spindle sleeve is sleeved on an outer side of the spindle assembly. An output end of the reducing motor is connected with the first worm, the first worm is meshed with the first worm gear, and one end of the turbine shaft is connected and provided at a center of the first worm gear.

The elevating axis assembly comprises an elevating axis, a first cylindrical gear, a second cylindrical gear, a left end face clutch gear, a right end face clutch gear, and a cam. The other end of the turbine shaft is connected with a center of the first cylindrical gear, the first cylindrical gear is meshed with the left end face clutch gear, and the second cylindrical gear is meshed with the right end face clutch gear. The cam is connected to the left end face clutch gear through a pin. The cam is provided with a control handle, and a disc spring is provided between the cam and the left end face clutch gear.

A second v-belt pulley is connected to an upper output end of the large motor.

Furthermore, the cam is provided with a cam control handle, and a disc spring is provided between the cam and the left end face clutch gear.

The present invention adopts an independent electromechanical transmission mechanism to drive the spindle system to realize the spindle automatic feeding, and the feeding speed is fixed. When the spindle rotates at a high rotational speed and a small diameter drill is used for drilling holes, the feed amount of every rotation of the spindle is small; when the spindle rotates at a medium speed and a medium diameter drill is used for drilling holes, the feed amount of every rotation of the spindle is medium; when the spindle rotates at a low speed and a large diameter drill is used for drilling holes, the feed amount of every rotation of the spindle is large. Every rotational speed of the spindle has a suitable self-adaptive spindle feed amount correspondingly, especially when the spindle rotational speed adopts the stepless speed regulation, a suitable feed amount of the spindle can be obtained even if the spindle rotational speed is adjusted arbitrarily.

DETAILED DESCRIPTION OF THE EMBODIMENTS

Figure 1:
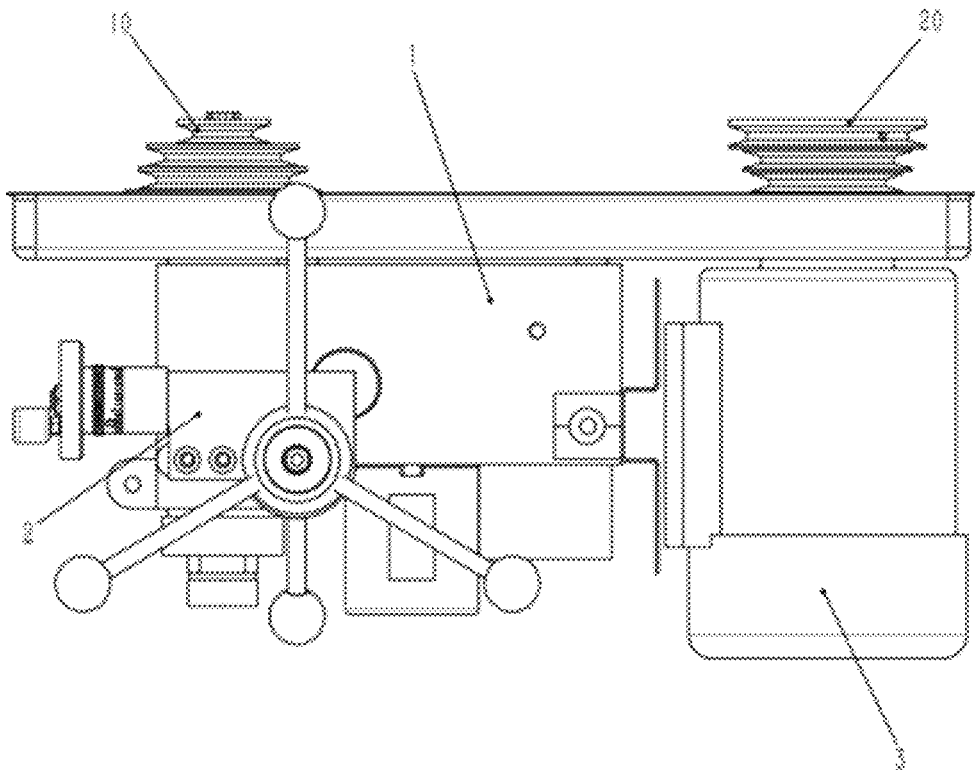
FIG. 1 is a first structural view of a spindle automatic feed mechanism of drilling machine with self-adaptive electromechanical transmission according to the present invention.
Figure 2:
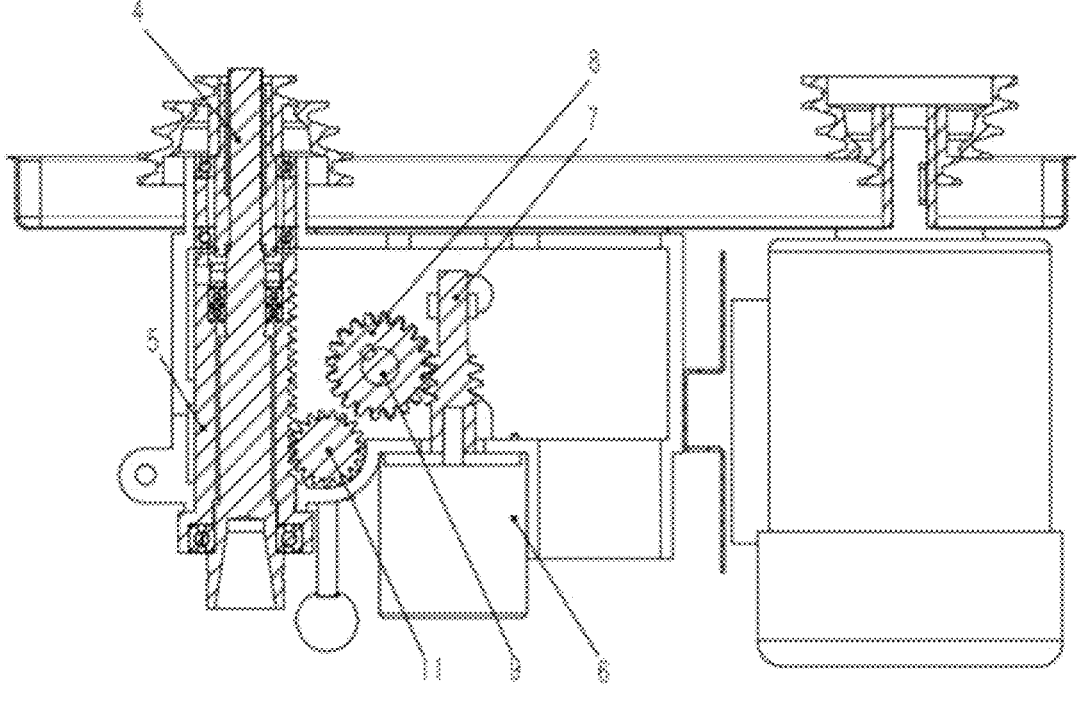
FIG. 2 is a second structural view of the spindle automatic feed mechanism of drilling machine with self-adaptive electromechanical transmission according to the present invention.
Figure 3:
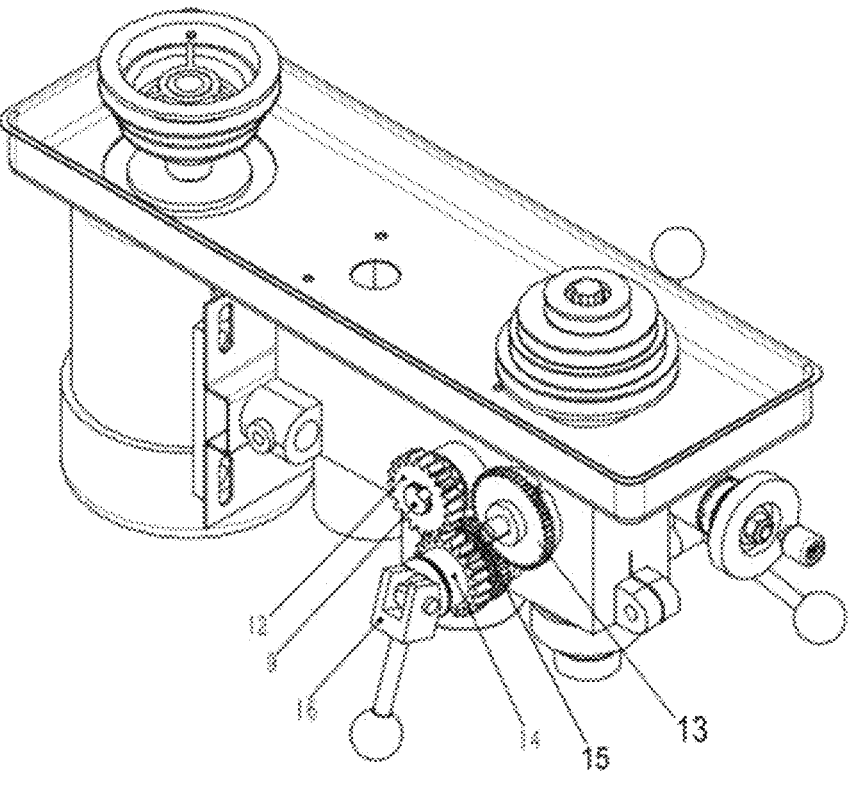
FIG. 3 is a third structural view of the spindle automatic feed mechanism of drilling machine with self-adaptive electromechanical transmission according to the present invention.
Figure 4:
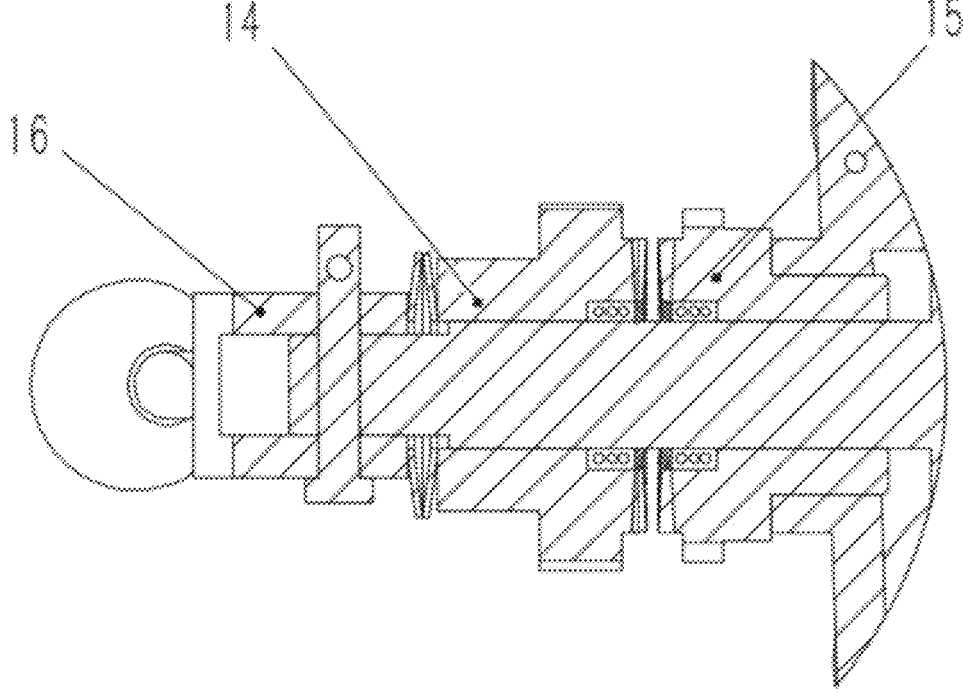
FIG. 4 is a structural view of a first cam state.
Figure 5:
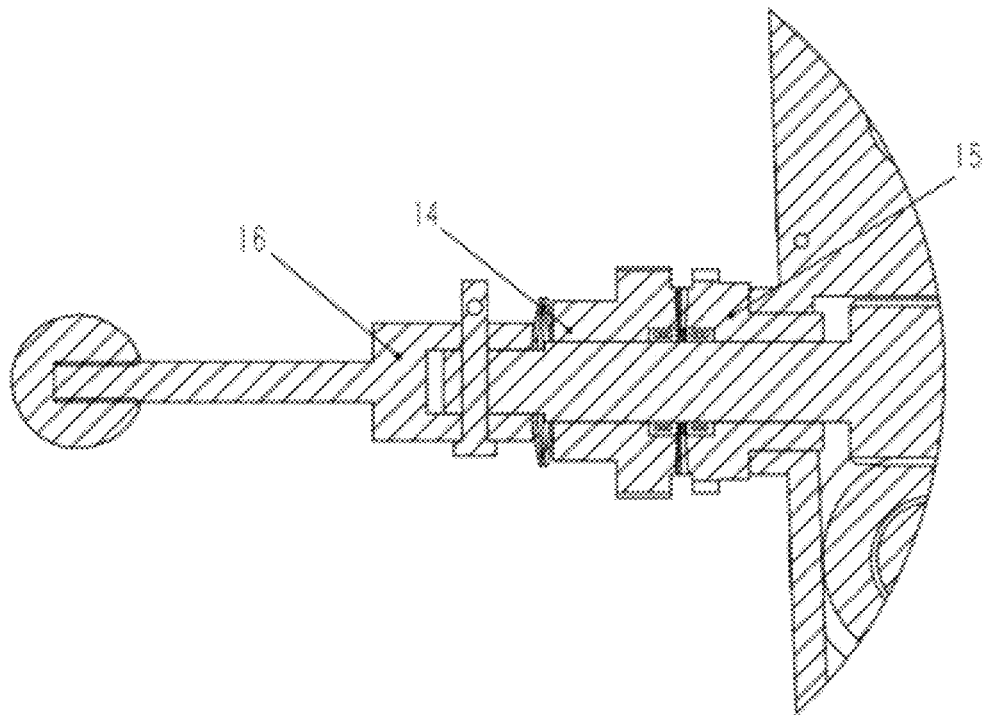
FIG. 5 is a structural view of a second cam state.
Figure 6:
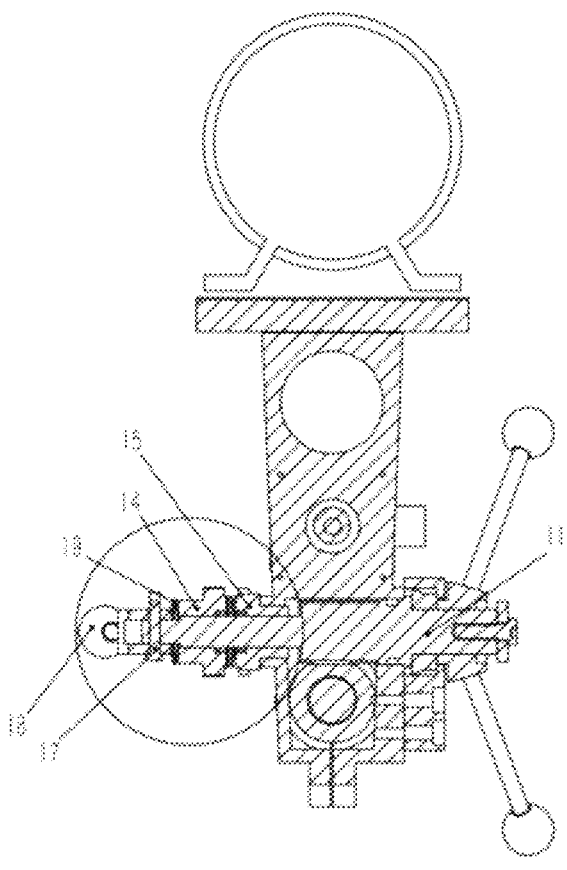
FIG. 6 is a fourth structural view of the spindle automatic feed mechanism of drilling machine with self-adaptive electromechanical transmission according to the present invention.

The technical solutions of present invention will be more clearly and completely illustrated hereafter in combination with the accompanying drawings.

In the descriptions of the present invention, it should be understood that the terms "center", "longitudinal", "lateral", "length", "width", "thickness", "upper", "lower", "front", "back", "left", "right", "vertical", "horizontal", "top", "bottom", "inside", "outside", "clockwise", "counterclockwise" and so on indicate orientations or positional relationships based on those shown in the accompanying drawings, only for the purposes of facilitating the descriptions of the present invention and simplifying the descriptions, but are not intended to indicate or imply that the device or element referred to must have a particular orientation, be constructed and operated in a particular orientation, and therefore cannot be construed as limitations of the present invention.

Furthermore, the terms "first" and "second" are used only for descriptive purposes and cannot be understood to indicate or imply relative importance or to indicate implicitly the number of technical features indicated. Therefore, the features defined as "first" and "second" features can explicitly or implicitly include at least one of the described features. In the description of the present invention, "multiple" means at least two, such as two, three, unless otherwise specifically defined.

In specific Embodiment 1, a spindle automatic feed mechanism of drilling machine with self-adaptive electromechanical transmission comprises a head housing assembly 1, an elevating axis assembly 2, and a large motor 3.

The head housing assembly 1 comprises a spindle assembly 4, a spindle sleeve 5, a reducing motor 6, a first worm 7, a first worm gear 8, and a turbine shaft 9. A first v-belt pulley 10 is connected with an upper end of the spindle assembly 4, and the spindle sleeve 5 is sleeved on an outer side of the spindle assembly 4. An output end of the reducing motor 6 is connected with the first worm 7, the first worm 7 is meshed with the first worm gear 8, and one end of the turbine shaft 9 is connected and provided at a center of the first worm gear 8.

The elevating axis assembly 2 comprises an elevating axis 11, a first cylindrical gear 12, a second cylindrical gear 13, a left end face clutch gear 14, a right end face clutch gear 15, and a cam 16. The other end of the turbine shaft 9 is connected and provided at a center of the first cylindrical gear 12, the first cylindrical gear 12 is meshed with the left end face clutch gear 14, and the second cylindrical gear 13 is meshed with the right end face clutch gear 15. The cam 16 is connected to the left end face clutch gear 14 through a pin 17. The cam 16 is provided with a cam control handle 18, and a disc spring 19 is provided between the cam 16 and the left end face clutch gear 14.

A second v-belt pulley 20 is connected to an upper output end of the large motor 3.

The present invention comprises the following five transmission relationships.

In transmission relationship 1, the reducing motor 6 drives the first worm 7 to rotate, the first worm 7 drives the first worm gear 8 to rotate, and the first worm gear 8 drives the turbine shaft 9 to rotate.

In transmission relationship 2, the turbine shaft 9 drives the first cylindrical gear 12 to rotate, thus to drive the left end face clutch gear 14 to idle under a first cam state.

In transmission relationship 3, under the first cam state, the left end face clutch gear 14 idles.

In transmission relationship 4, under a second cam state, the left end face clutch gear 14 is meshed with the right end face clutch gear 15 so as to drive the elevating axis 11 start to rotate and to feed downwards automatically.

In transmission relationship 5: under the second cam state, the right end face clutch gear 15 drives the second cylindrical gear 13 to rotate and to start downwards to feed automatically; the disc spring 19 starts to tighten; when the cam control handle 18 is pressed, entering the first cam state, the disc spring 19 rebounds, the second cylindrical gear 13 starts to rotate in an opposite direction, thus to drive the right end face clutch gear 15 to rotate in an opposite direction; the right end face clutch gear 15 drives the first cylindrical gear 12 to rotate in an opposite direction, and then the elevating axis 11 rotates in an opposite direction and drives the spindle to move upwards slowly and to return back finally.

The present invention adopts the independent electromechanical transmission mechanism to drive the spindle system to realize the spindle automatic feeding, and the feeding speed is fixed. When the spindle rotates at a high rotational speed and a small diameter drill is used for drilling holes, the feed amount of every rotation of the spindle is small; when the spindle rotates at a medium speed and a medium diameter drill is used for drilling holes, the feed amount of every rotation of the spindle is medium; when the spindle rotates at a low speed and a large diameter drill is used for drilling holes, the feed amount of every rotation of the spindle is large. Every rotational speed of the spindle has a suitable self-adaptive spindle feed amount correspondingly, especially when the spindle rotational speed adopts the stepless speed regulation, a suitable feed amount of the spindle can be obtained even if the spindle rotational speed is adjusted arbitrarily.

In the descriptions of the present invention, it should be noted that unless otherwise clearly defined and limited, the terms "arrange", "connect to", "connect with" should be understood in a broad sense. For example, it can be fixedly connected, detachably connected, or integrally connected. It can be mechanically connected or electrically connected; it can be directly connected or indirectly connected through an intermediate medium, or it can be the internal communication of two elements. For those skilled in the art, the specific meanings of the above terms in the present invention can be understood in specific circumstances.

In the descriptions of the present invention, unless otherwise expressly provided and defined, a first feature being "on" or "under" a second feature can be interpreted as that the first feature is directly in contact with the second feature, or the first feature is indirectly in contact with the second feature through an intermediate medium. Moreover, the first feature being "above", "over" and "on" the second feature can be interpreted as that the first feature is directly above or obliquely above the second feature, or can be interpreted simply as that a level height of the first feature is higher than that the second feature. The first feature being "below", "underneath" and "under" the second feature can be interpreted as that the first feature is directly below or obliquely below the second feature, or can be interpreted simply as that a level height of the first feature is less than that of the second feature.

In the description of the present specification, the reference terms "one embodiment", "some embodiments", "examples", "specific examples", or "some examples" mean that the specific features, structures, materials or characteristics described in conjunction with the embodiments or examples are included in at least one embodiments or examples of the present invention. In the present specification, indicative expressions of the above terms do not necessarily refer to the same embodiments or examples. Furthermore, the specific features, structures, materials, or characteristics described can be combined in an appropriate manner in any one or more embodiments or examples.

The above described are only some preferred embodiments of the present invention, and they are not used to limit the present invention. Any modifications, equivalent replacements and improvements made within the spirits and principles of the present invention, should be all included in the protection scope of the present invention.

What is claimed is:

1. A spindle automatic feed mechanism of drilling machine with self-adaptive electromechanical transmission, comprising a head housing assembly, an elevating axis assembly, and a large motor, wherein the head housing assembly comprises a spindle assembly, a spindle sleeve, a reducing motor, a first worm, a first worm gear, and a turbine shaft; a first v-belt pulley is connected with an upper end of the spindle assembly, the spindle sleeve is sleeved on an outer side of the spindle assembly, an output end of the reducing motor is connected with the first worm, the first worm is meshed with the first worm gear, and one end of the turbine shaft is connected and provided at a center of the first worm gear;

the elevating axis assembly comprises an elevating axis, a first cylindrical gear, a second cylindrical gear, a left end face clutch gear, a right end face clutch gear, and a cam; the other end of the turbine shaft is connected with a center of the first cylindrical gear, the first cylindrical gear is meshed with the left end face clutch gear, the second cylindrical gear is meshed with the right end face clutch gear, the cam is connected to the left end face clutch gear through a pin; and a second v-belt pulley is connected to an upper output end of the large motor.

2. The spindle automatic feed mechanism of drilling machine with self-adaptive electromechanical transmission according to claim 1, wherein the cam is provided with a cam control handle, and a disc spring is provided between the cam and the left end face clutch gear.

\* \* \* \* \*